Figure 1:
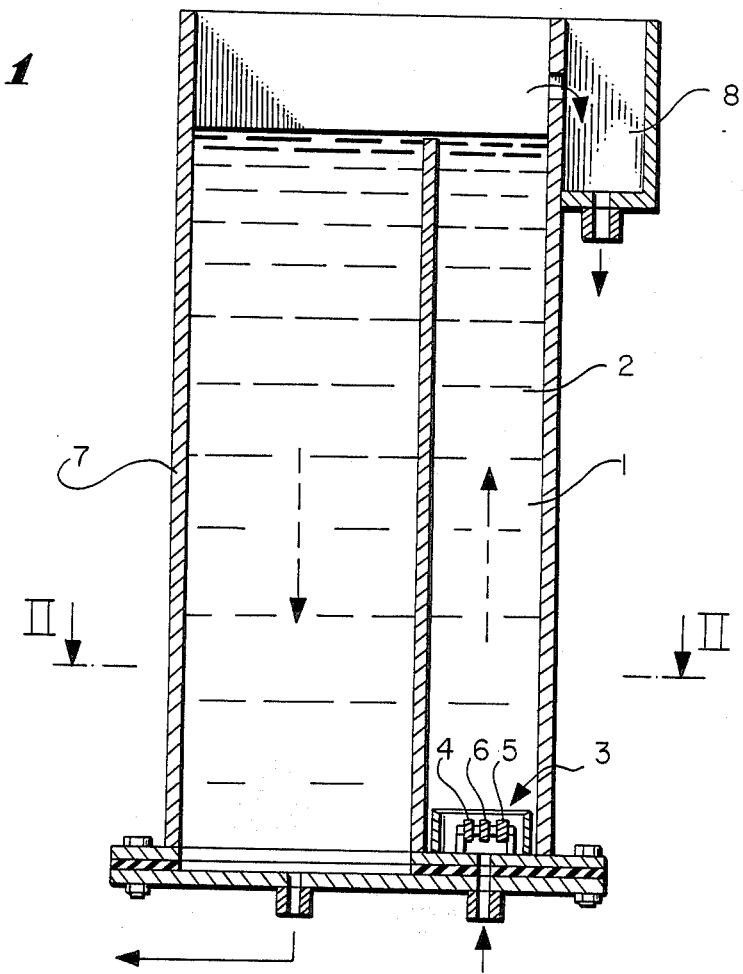

United States Patent [19]

Renzler

[11] Patent Number: 4,728,410
[45] Date of Patent: Mar. 1, 1988

[54] PROCESS FOR THE SEPARATION OF EMULSIONS CONTAINING WATER AS A CONTINUOUS PHASE AND DEVICE FOR THE APPLICATION OF THE PROCESS

[76] Inventor: Edgar Renzler, Siegstrasse 2, Köln 40 5000, Fed. Rep. of Germany

[21] Appl. No.: 943,508

[22] Filed: Dec. 19, 1986

Related U.S. Application Data

[62] Division of Ser. No. 865,735, Apr. 11, 1986.

[30] Foreign Application Priority Data

Aug. 11, 1984 [DE] Fed. Rep. of Germany ....... 3429612
Oct. 7, 1984 [DE] Fed. Rep. of Germany ....... 3437055
Nov. 12, 1984 [DE] Fed. Rep. of Germany ....... 3444074
Apr. 26, 1985 [DE] Fed. Rep. of Germany ....... 3515095
Jul. 20, 1985 [DE] Fed. Rep. of Germany ....... 3525963

[51] Int. Cl.$^4$ ............................................. C02F 1/46
[52] U.S. Cl. .................................................. 204/275
[58] Field of Search ............... 204/238, 240, 275, 276, 204/232, 237

[56] References Cited

U.S. PATENT DOCUMENTS 4,121,993 10/1978 Krugmann ........................ 204/149

FOREIGN PATENT DOCUMENTS 2627964 5/1978 Fed. Rep. of Germany ...... 204/149
2045803 11/1978 United Kingdom ................ 204/149

Primary Examiner—T. M. Tufariello
Attorney, Agent, or Firm—Eric P. Schellin

[57] ABSTRACT

Apparatus for the purification of an aqueous effluent containing a fatty-oil substance as an impurity. The apparatus includes an electrolytic cell having a pair of inert electrodes. Therebetween is located a non-touching decomposable hydroxyl producing metal structure. A D.C. electric current is set up between the electrodes whereby the metal structure is decomposed to form a complex. The said complex combines with the fatty-oily substance.

3 Claims, 2 Drawing Figures

PROCESS FOR THE SEPARATION OF EMULSIONS CONTAINING WATER AS A CONTINUOUS PHASE AND DEVICE FOR THE APPLICATION OF THE PROCESS

This application is a division, of application Ser. No. 865,735, filed 4/11/1986.

The invention relates to a process for decomposing oil-in-water emulsions in an electrolysis cell powered by direct current and the apparatus to carry out the method.

Due to the increased use of synthetic products based on mineral oils, which are biologically only poorly decomposable, ground and above ground water is increasingly loaded with matter, like, e.g. petroleum, diesel fuels, heating and lubricating oils and surface active substances.

In consideration of the increasing environmental load the authorities have made the discharge of these dangerous substances above certain concentrations into waters, a punishable offence Macro-emulsions are polyphase systems with greater contact surfaces and contact surface tension which do not disappear, on which their instability depends. This means that these emulsions tend to reach the lowest possible energy stage, towards sedimentation or flotation and thereby finally to coalescence.

Micro-emulsions are however isotropic, thermodynamic stable systems, whose dispersed phase appears in the form of particles smaller than 2000 angström units. They develop spontaneously by the interaction of the corresponding molar ratios of peptising mediums, tenside, oil and water.

The stability of emulsions is increased by the addition of emulsifying surface active compounds. This involves bipolar substances that reduce the surface tension between the phases.

The overall stability of an emulsion is determined by the sum of the van der Waal attraction forces and the repulsion of the generally negatively charged particles due to Coulomb forces.

Coagulation and flocculation can result from the removal of the charge of the particles i.e. the zeta potentials of the emulsified particles. Should a particle move, for example as a result of an imposed electrical field, one part of the diffuse double layer would be stripped off and if the energy barrier between the particles in small enough, a flocculation process can be caused only by the particles moving closer together.

To comply with the norms suggested by law, the breaking of oil/water emulsions, to avoid pollution of the environment is necessary in all circumstances. Some technical solutions are known to achieve this, namely mainly: ultrafiltration, the mixing in of de-emulsifiers, ultrasonic sound, chemical dosing, dialysis, electrocoagulation.

These processes are however partially concerned with high investments and high operating costs and are particulary uneconomical for small quantities of highly polluted waste water. An important object of this invention was therefore to make a versatile, cost favourable process available.

Other technical separation processes for the recovery of products concern the preparation for example of ore, coal, salt and dewatering, and here one of the best known processes is flotation based on the observations of W. Haynes (British Patent No. 488 of 1860). This flotation is applied in many branches of industry also in the form of electroflotation, for example in the separation of silver from used photobaths.

With this flotation gas bubbles are produced in watery solutions from the water by the aid of electrolysed hydrogren and oxygen, that is in the medium itself which is subject to the separation. In addition the separation yield can be considerably increased by the simultaneous coagulation of the solids in the watery solution.

It is apparent that in the field of the decomposition of emulsions of the abovenamed kind, it would be a marked advance when it could be achieved to apply electroflotation and electrocoagulation together with electrophoretic effects also to these systems and to decompose these emulsions to an energetic replaceable extent. At the same time it would also be possible to use this form of emulsion decomposition in the separation of organisms from nutrient solutions and by means of the simultaneous metal addition to add the necessary cations to the solution to do away with present processes, namely centrifuging or flotation by blowing in of air and the following emulsion decomposition by pH-value-lowering and following on that the addition of cations.

In known flotation processes for waste water purification, the required gas bubbles, especially air bubbles are generated through porous ceramic bodies, nozzles, stirred gasifiers, pressure release of air saturated water and even by the generation of gas bubbles from the waste water by means of electrolysis. Before flotation, flocculant and flocculation aids are added to the waste water to initiate flocculation.

In all flotation processes the efficiency of the flotation is dependent upon the volume and the number of gas bubbles. Too large gas bubbles and too strong gasification lead instead of the flotation of suspended matter to an intensive mixing of the suspension to be seperated and thereby leads to the opposite effect.

Looking back on the work with emulsions of this type and with emulsified oil polluted waste water and considerable expense causing difficulties, there has long been a need in technology to make a process available, which can achieve the decomposition of emulsions of the type described above without great technical consumption and without the difficulties that have been observed up to now and thereby also to render for smaller emulsion amounts and waste water amounts a simple and sure treatment and care and thereby to achieve the desired result not only in cost saving but especially also in the actual requirements.

The invention provides a process for the electrolytic decomposition of oil/water emulsions in an electrolysis cell powered by direct current that is characterised in that the emulsions are decomposed in a cell with at least one intermediate soluble metal inlay in a bundle of stable electrodes in an acidic to alkaline range of pH values up to about 12 with a current consumption of 0,1 to 4 Ah/dm$^3$ and a predetermined residence time in the cell as a result of coagulation floculation and flotation.

This process can be carried out in a continuous as well as an intermittent manner, where the continuous process develops a special significance.

In operations according to the invention it has been found to be advantageous to work with coagulation and flotation pH-values in the ranges of 4 to 6,8 and 8 to 12 with a current consumption of 0,1 to 4Ah/dm$^3$ and a residence time of 5 to 120 min. It is of special value to work with coagulation and flotation pH's which range from 6,8 to 8, a residence time of 2 to 30 min and a current consumption of 0,1 to 2 Ah/dm$^3$.

The coagulation and flotation, according to the invention, are done in a cell and within the bundle of stable electrodes are arranged one or more soluble metal inlays, with at least one being a hydroxide forming metal in an alkaline medium, particulary an aluminium or iron plate. The surface relationship of the soluble metal inlays should according to the invention, be 1:0,1 to 1:60, in particular 1:1 to 1:20.

By operating the process according to the invention it has been found to be significant to change the direct current direction periodically every 5 to 3600 seconds.

The process according to the invention has the great advantage that coagulant as well as gas can be produced in precisely determined quantities, whereby the bubble sizes of the gas bubbles can vary widely according to the nature of the surfaces of the stable electrodes and material peculiarities.

According to the invention for example, graphite, titanium, platinum coated titanium or refined steels may be used as stable electrodes.

The additional great advantage of the invention rests in the fact that no additional energy is expended to introduce coagulation means and it supports a notable electrophoretic effect of the invention and thereby the coagulated grease and oil particles froth up due to adsorption to the gas bubbles on the surfaces of the electrolysis cell or the other collecting device and additionally, as required, a simultaneous reduction of, for example, chrome may be carried out. Should any waste water contain tensides at the same time, whose loss from the water is not desired, an electrode may be selected to produce a foamy flotation and so a simultaneous removal of surface active materials can result.

An apparatus for the operation of the process according to the invention is represented in the drawings and the invention will be more fully explained with reference to them.

Figure 2:
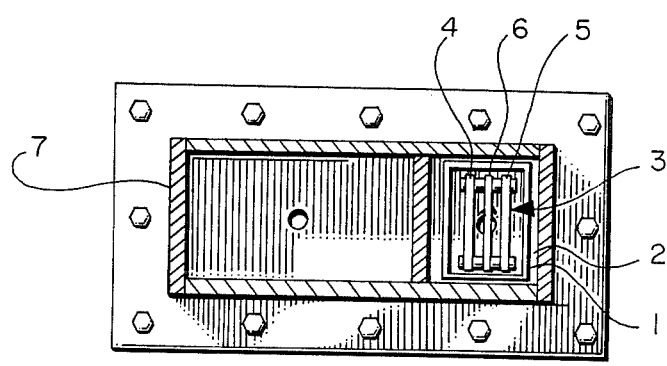

This apparatus for the operation of the process according to the invention is in FIG. 1 represented in section. This apparatus includes mainly an electrocoagulator (1) and electroflotator (2) with the bundle (3) arranged within it, the stable electrodes (4) and (5) with intermediate metal inlays (6). The electrocoagulator (2) is in a reactor (7) with overflow system (8). The electrocoagulator (1) combined with the reactor (7) along line 11—11 in FIG. 1 is represented in section in FIG. 2.

I claim:

1. An apparatus for the purification of an aqueous effluent containing a fatty-oil substance as an impurity comprising an electrolytic cell, said cell having at least one pair of inert electrodes, said inert electrodes having at least one non-electric touching decomposable hydroxyl producing metal structure therebetween, said metal structure being decomposable under acidic to alkaline conditions of between a pH of 4 to a pH of 12, electric means to impinge a D.C. current on said electrodes of 0.1 to 4 Ah/dm$^3$ whereby said metal structure is decomposed as a metal hydroxyl complex and wherein said thus produced metal hydroxyl complex combines with said fatty-oily substance for separating said fatty oil substance complex from said effluent.

2. The apparatus of claim 1 wherein the surface relationship of an inert electrode to the said metal structure is from 1:0.1 to 1:60.

3. The process according to claim 1 wherein electric means includes means to switch the polarity of the D.C. electric current every 5 to 3600 seconds.

* * * * *